United States Patent [19]

Patterson

[11] 4,416,482
[45] Nov. 22, 1983

[54] VEHICLE GATE ASSEMBLY

[75] Inventor: Charles C. Patterson, Waco, Tex.

[73] Assignee: Willie Mae Patterson, Waco, Tex.

[21] Appl. No.: 222,247

[22] Filed: Jan. 2, 1981

[51] Int. Cl.³ ............................................. B60P 3/00
[52] U.S. Cl. .......................................... 296/3; 49/260;
296/24 C; 296/50
[58] Field of Search .................... 296/3, 24 C, 50, 52, 296/53, 55; 49/214, 257, 260

[56] References Cited
U.S. PATENT DOCUMENTS

| | | | |
|---|---|---|---|
| 3,063,496 | 11/1962 | Kessler | 49/257 |
| 3,600,032 | 8/1971 | Gross | 296/50 |
| 3,990,183 | 11/1976 | Meggs | 49/257 |
| 4,089,135 | 5/1978 | Beny | 49/260 |
| 4,199,186 | 4/1980 | Faverino | 296/50 |

Primary Examiner—Joseph F. Peters, Jr.
Assistant Examiner—John A. Carroll
Attorney, Agent, or Firm—Gerald G. Crutsinger; John F. Booth; Monty L. Ross

[57] ABSTRACT

A gate assembly is adapted to be used with a vehicle which has a cargo area defined by at least two sides extending substantially parallel to one another and comprises a gate member adapted to be moveably disposed within the cargo area of the vehicle and having a body with first and second sides. Guiding apparatus is adapted to be connected to the vehicle to restrict movement of the gate member between an open position to allow access into the cargo area and a closed position to limit access into the cargo area. Follower apparatus is adapted to be connected to the gate member to cooperate with the guiding apparatus by restricting movement of the first end of the gate member along a direction line substantially parallel to the sides of the vehicle and for restricting movement of the second end of the gate member along a direction line substantially transverse to the parallel sides of the vehicle when the gate member is being moved between the open and closed position.

16 Claims, 6 Drawing Figures

VEHICLE GATE ASSEMBLY

BACKGROUND AND BRIEF SUMMARY OF THE INVENTION

This invention relates generally to a Vehicle Gate Assembly and more particularly to an End Gate Assembly mounted on a trailer.

The use of gate assemblies to prevent a load, specifically livestock, from leaving the cargo space on a vehicle are well known. Typically, these gate assemblies include a gate member pivotally connected at the side walls of the vehicle. To unload the livestock, it is thus necessary to swing the gate members either into the cargo space or away from the cargo space. In certain unloading areas, it is impossible to move the gate members outwardly of the cargo space after the vehicle has been positioned at the discharge chute. Thus, it is necessary to open the gates prior to positioning the vehicle which necessitates the use of two people, one driving the vehicle and the other preventing the livestock from fleeing the cargo area prior to the vehicle being positioned at the discharge chute. Further, should the gate members be pivotally moved into the cargo area of the vehicle, the number of livestock loaded into the vehicle will be less because of possible interference when opening the gate assembly.

Accordingly, it is an object of the present invention to provide a gate assembly that permits a single individual to move a vehicle carrying livestock to a discharge location.

Further, it is an object of the present invention to provide a vehicle gate assembly that permits more complete usage of cargo space in the vehicle than prior art gate assemblies.

In accordance with the present invention, a vehicle gate assembly is provided that comprises a gate member connected to the vehicle within a cargo area and moveably disposed between an opened position to allow access into the cargo area and a closed position to limit access into the cargo area. The gate member includes a body having first and second ends. A support apparatus is connected to the vehicle for restricting movement of the first end of the gate member to a direction lying substantially parallel to a side of the vehicle and for restricting movement of the second end of the gate member to a direction extending between the sides of the vehicle enclosing the cargo space when the gate member is being moved between the opened and closed positions.

BRIEF DESCRIPTION OF THE DRAWINGS

Other objects and advantages of the invention will become apparent on reading the following detailed description and upon reference to the drawings in which like reference characters are used throughout to designate like parts.

DETAILED DESCRIPTION OF THE INVENTION

Figure 1:
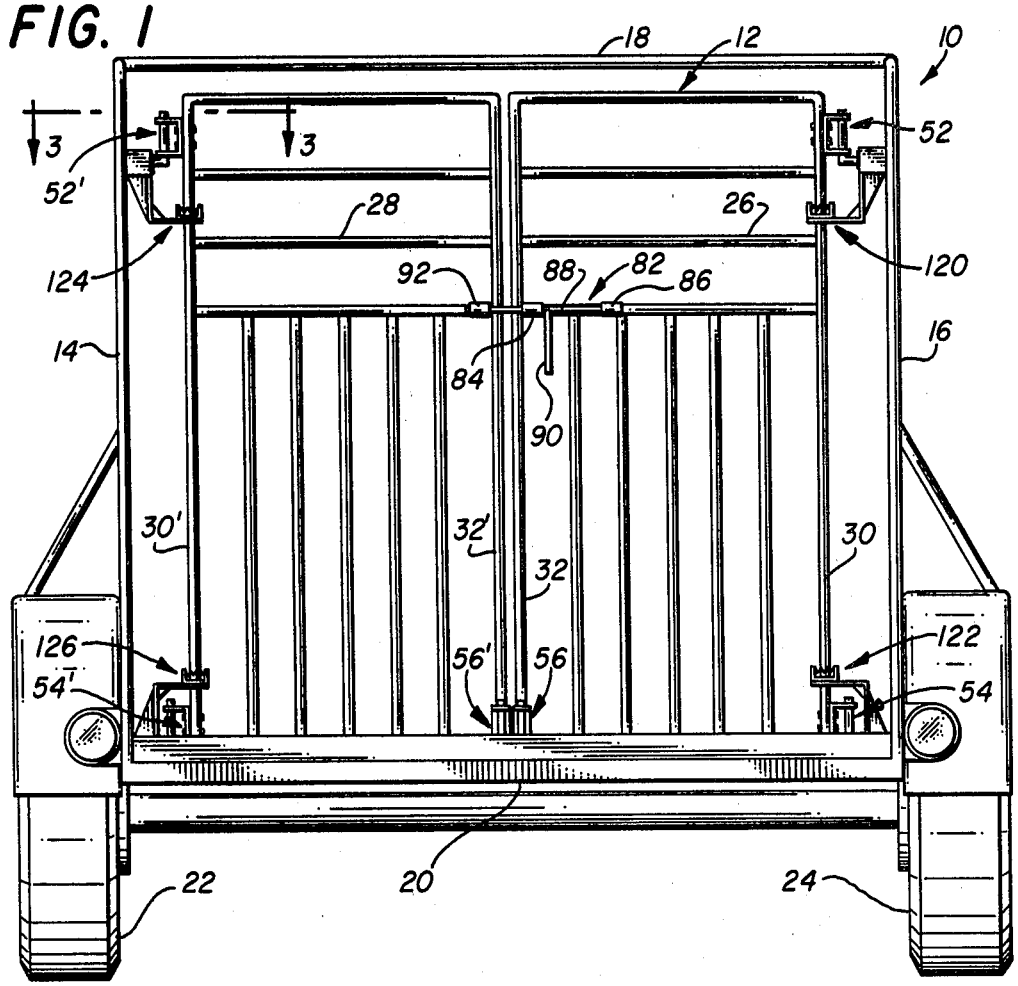
FIG. 1 is an elevational view looking into the end of a vehicle having a gate assembly constructed according to the present invention mounted thereon.
Figure 2:
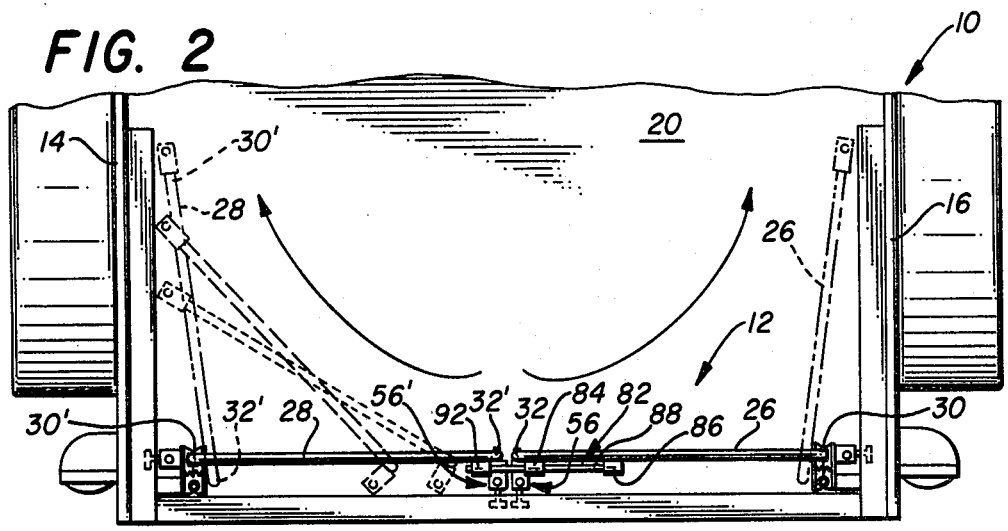
FIG. 2 is a plan view of a portion of the vehicle showing movement of the gate assembly constructed according to the present invention shown in FIG. 1.

Turning first to FIGS. 1 and 2, there is shown a conventional vehicle 10, preferably a trailer, having a gate assembly 12 constructed according to the present invention mounted at the rear end of the vehicle. It is preferred that vehicle 10 is a conventional trailer type vehicle having sidewalls 14 and 16, which face and extend substantially parallel to one another, and an end wall 18 extending substantially transverse between sidewalls 14 and 16 across the front of trailer 10, and a bed 20 supporting a cargo, preferably livestock, between wheels 22 and 24.

Gate assembly 12 preferably includes a first gate member 26 and a second gate member 28 with each gate member having a framework body with a first side 30 and a second side 32. Although it is preferred that two gate members be used with second sides 32 of each gate member being disposed adjacent one another when closed, a single gate member may be used when sidewalls 14 and 16 are moved closer together, which occurs in more narrow trailers.

Guiding apparatus 34 is connected to vehicle 10 for restricting movement of first side 30 to a direction lying substantially parallel to sides 14 or 16 and for restricting movement of second side 32 of gate members 26 or 28 to a direction lying substantially perpendicular or transverse to sides 14 or 16. Thus, gate members 26 and 28 are moved between an opened position with second sides 32 of gate member 26 being disposed is close proximity to sidewall 16 and with second side 32' of second member 28 being disposed in close proximity to sidewall 14 (as best seen in dotted outline in FIG. 2) and a closed position to limit access into the cargo area with second side 32 of gate member 26 and second side 32' of gate member 28 being disposed adjacent one another in the closed position (as shown in solid outline in FIG. 2).

Figure 6:
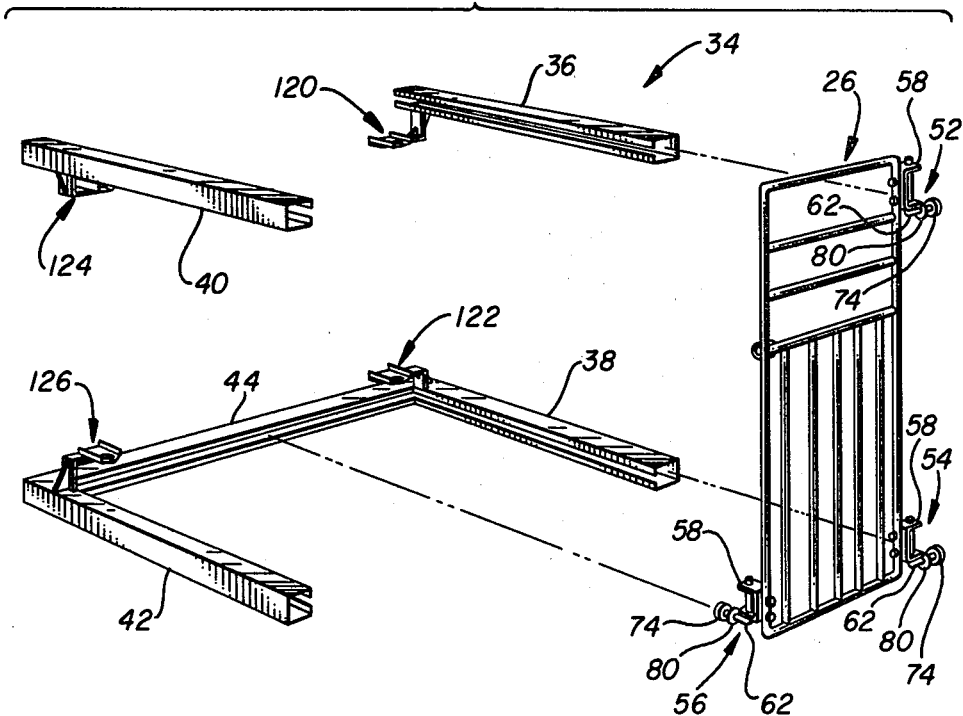
FIG. 6 is an exploded, perspective view illustrating a vehicle gate assembly kit.

As best shown in FIG. 6, the gate members, even though only gate member 26 is shown, and guiding apparatus 34 may be provided in a kit for adding to a conventional vehicle 10.

Figure 5:
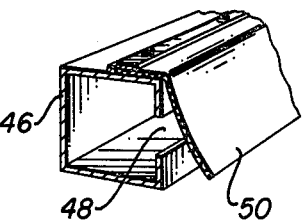
FIG. 5 is a perspective view of a portion of the invention shown in FIG. 1.

Guiding apparatus 34 includes an upper sidewall track 36 and a lower sidewall track 38 adapted to be attached to a sidewall, such as sidewall 16 in FIGS. 1-2, a second upper sidewall track 40 and a second lower sidewall track 42 adapted to be connected to the sidewall of a vehicle, such as sidewall 14 (as shown in FIGS. 1 and 2), and a lower end track 44 adapted to be positioned across the rear end of the trailer on the bed. Each of these tracks is made up of elongated C-shaped channel members (a portion of which is shown in FIG. 5 as reference numeral 46) with the opening 48 facing the interior of the cargo space on the vehicle. If desired, flexible cover 50 is attached to the upper surface of channel 46 so that a free end will drape over opening 48 to prevent foreign matter passing into the interior of channel 46.

Figure 4:
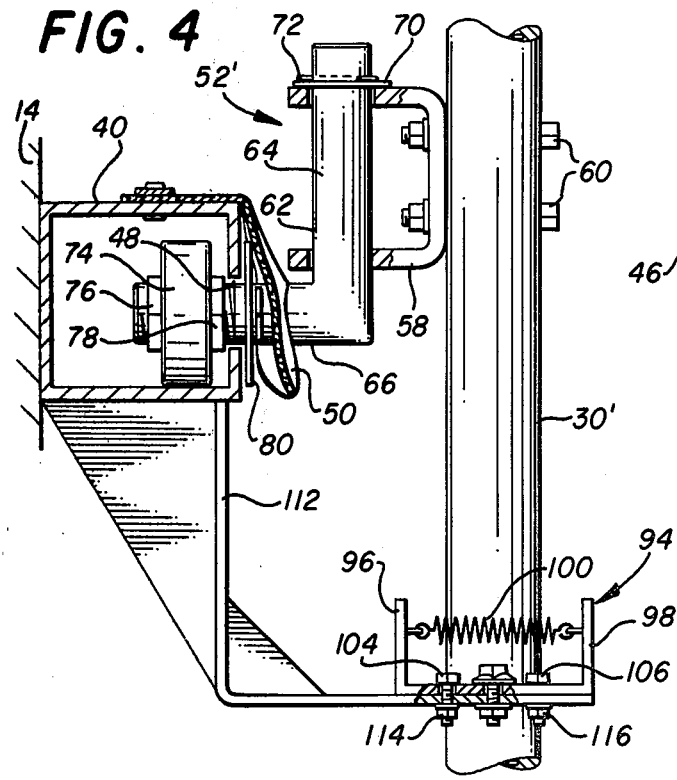
FIG. 4 is an end view of the portion of the invention shown in FIG. 3 taken along the lines and in the direction of arrows 4—4.

As best shown in FIGS. 4 and 6, guiding apparatus 34 includes an upper bearing member 52 and a first lower bearing member 54 connected to side 30 of first member 26 and a second lower bearing member 56 connected to side 32 of first gate member 26, while second gate member 28 has upper bearing member 52' and first lower bearing member 54' connected to side 30' and second lower bearing member 56' connected to second side 32'. These bearing members are provided for traveling in tracks 36, 38, 40, 42 and 44.

Figure 3:
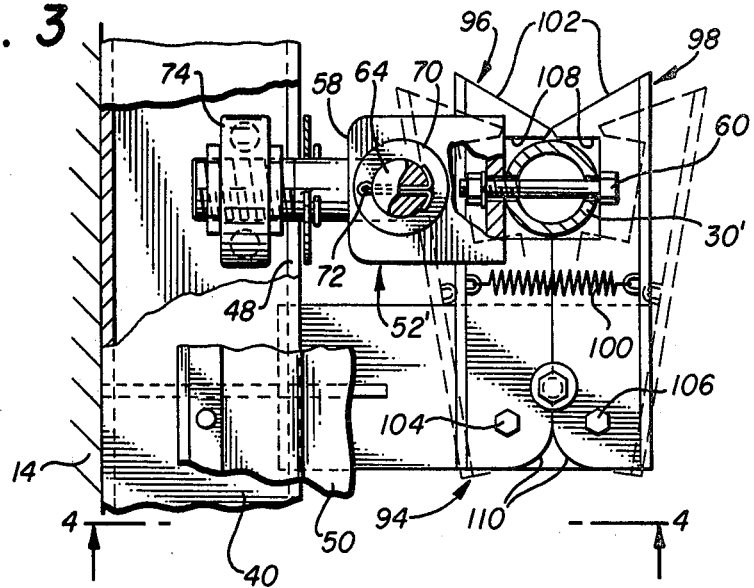
FIG. 3 is an enlarged cross-sectional plan view of a portion of the invention shown in FIG. 1 taken across the lines and in the direction of arrows 3—3.

As best seen in FIGS. 3 and 4, bearing members 52, 54, 56, 52', 54', and 56' include a U-shaped channel 58 with the inner connecting base part of the U-shaped channel attached to the side of the respective gate member 26 or 28, as with the nut and bolt arrangement 60 shown in the drawings. An L-shaped shaft 62 is provided with a vertical portion 64 extending through aligned openings in the opposed sides of U-shaped channel 58 and a horizontal portion 66 extending into opening 48 of tracks 36, 38, 40, 42 and 44. A washer 70 is disposed around vertical portion 64 of shaft 62 to rest upon the upper surface of U-shaped channel 58 and a cotter pin 72 extends through an opening provided in vertical portion 64 of shaft 62 to prevent shaft 62 from disengaging U-shaped channel 58. A roller 74 is connected at its central rotating axis to horizontal portion 66 of shaft 62 by use of nuts 76 and 78 threadedly connected to shaft 62. A bushing 80 is connected to vertical portion 64 of shaft 62 to prevent movement of vertical portion 64 closer toward wall 14, as shown in FIG. 4, while roller 76 prevents movement of horizontal portion 66 of shaft 62 away from wall 14 which thereby aids in providing stability of movement to gate members 26 and 28 when being moved between the opened and closed positions.

As best shown in FIGS. 1 and 2, an assembly 82 may be used for latching first door member 26 to second door member 28. This latching assembly preferably includes a first tubular member 84 and a second tubular member 86 attached to door 26 and slidably receiving a lock bolt 88 with a handle 90 extending laterally therefrom and disposed between first and second tubular members 84 and 86, respectively. A third tubular member 92 is connected to second gate member 28 in alignment with tubular members 84 and 86 for receiving lock bolt 88 therein when the lock bolt is moved to the locked position.

When gate members 26 and 28 are of a frame like construction, as shown, another latching apparatus may be used to secure the gate members in the closed position. This latching assembly takes the form a latch assembly 94 positioned near the rear end of vehicle 10 near sidewalls 14 and 16 and receives a portion of the frame of each gate member when the gate member is in the closed position. Latch assembly 94 is best seen in FIGS. 3 and 4 and includes opposed L-shaped members 96 and 98. L-shaped members 96 and 98 are urged toward one another by use of a spring 100 connected to the vertically extending portions of members 96 and 98. The horizontally extending portion of each L-shaped member 96 and 98 includes a first tapering shoulder 102 against which the tubular portion 30', as shown in FIGS. 3 and 4, strikes when gate members 26 and 28 are moved into the closed position. Shoulders 102 are tapered so as to be urged away from one another about pivoting axes 104 and 106. A rectangular cutout channel 108 is provided in opposed relationship in members 96 and 98 for receiving tubular member 30 or 30' when gate member 26 or 28 is moved to the closed position. Thus, opposed latching members 96 and 98 act as movable jaws in which tubular member 30 or 30' is received when gate members 26 and 28 are moved to the closed position. Further, the horizontally extending portion of L-shaped members 96 and 98 have been provided with articulate shoulders 110 to enable members 96 and 98 to be moved about pivot points 104 and 106 when disposed in facing relationship. Each latch assembly 94 is supported by a bracket 112 by use of a nut and bolt arrangement 114 pivotally aligned with axis 104 and a nut and bolt arrangement 116 pivotally aligned with pivotal axis 106. To position the latch assembly at the proper location for first gate member 26, an upper latch assembly 120 and a lower latch assembly 122 are provided near the rear end of vehicle 10 by connecting bracket 112 to upper sidewall track 36 and lower sidewall track 38, respectively. Also, second gate member 28 is latched in a closed position by providing a second upper latch assembly 124 and a second lower latch assembly 126 near the end of the vehicle by mounting bracket 112 to second upper sidewall track 40 and to second lower sidewall track 42, respectively.

In operation, the vehicle 10 is backed into a loading area and gates 26 and 28 are unlatched and moved to the opened position as shown in dotted outline in FIG. 2. The livestock are then loaded and gate members 26 and 28 moved to the closed position, as shown in solid outline in FIG. 2. Movement of the gates to the closed position will cause latches 120, 122, 124 and 126 to open and close around tubular members 30 and 30' to thereby latch the gates in a closed position. Further, lock bolt 88 is moved to the closed position thereby further locking gate members 26 and 28 to one another in the closed position. When arriving at the destination, the vehicle is merely backed into the unloading position, the driver moves locking bolt 88 to the open position and disengages latch assemblies 120, 122 124 and 126 from gate members 26 and 28 and moves gate members 26 and 28 to the open position. The livestock are then chased out of the vehicle and down the loading ramp to their eventual destination.

Further the gate assembly may be provided in a kit form for mounting to a conventional vehicle 10. This is accomplished by merely mounting guide apparatus 34 to the bed and sidewalls of vehicle 10 with opening 48 facing interiorly of the cargo space and lower end track 44 disposed adjacent along bed 20 near the rear end of vehicle 10. Rollers 74 are then aligned for movement within the C-shaped channel members of guiding apparatus 34 with the horizontal portion 66 of shaft 62 extending through opening 48 of the channel members. Of course, it is important to remember that lower bearing members 56 and 56' of first gate member 26 and second gate member 28, respectively, should be moved into C-shaped channel member 38 or 42, respectively, prior to aligning bearing members 52 and 54 so that sides 32 and 32' will be adjacent one another when gates 26 and 28 are in the closed position.

The invention having been described, what is claimed is:

1. A gate assembly used with a vehicle which has a cargo area defined by at least two sides extending substantially parallel to one another, comprising: a gate member connected to the vehicle within the cargo area and moveably disposed between an opened position to allow access into the cargo area and a closed position to limit access into the cargo area, said gate member having a body with first and second sides; guiding means connected to the vehicle for restricting movement of the first side of said gate member to a direction line substantially parallel to the parallel sides of the vehicle and for restricting movement of the second side of said gate member to a direction line substantially perpendicular to the parallel sides of the vehicle when said gate member is being moved between the opened and closed positions; and locking means adapted to maintain the first and second sides of said gate member in a fixed transverse relation to the parallel sides of the vehicle when said gate member is in the closed position.

2. A gate assembly as set forth in claim 1, wherein said guiding means includes upper and lower channel members disposed along one sidewall of the vehicle and an end member extending transversely between the sidewalls of the vehicle, and roller apparatus connected to the gate member and moveably disposed within said channel members.

3. A gate assembly as set forth in claim 2, including a flexible cover connected to each said channel member and extending across an opening into said channel member to prevent foreign matter from entering said channel member.

4. A gate assembly as set forth in claim 1, wherein said gate member includes a frame structure of tubular members; and including upper and lower latch assemblies disposed adjacent a sidewall of the vehicle and disposed to engage a tubular member extending along the first side of said gate member when said gate member is moved into the closed position.

5. A gate assembly as set forth in claim 4, wherein said guiding means includes upper and lower channel members disposed along one sidewall of the vehicle and an end member extending transversely between the sidewalls of the vehicle, and roller apparatus connected to the gate member and moveably disposed within said channel members.

6. A gate assembly as set forth in claim 5, including a flexible cover connected to each said channel member and extending across an opening into said channel member to prevent foreign matter from entering said channel member.

7. A gate assembly as set forth in claim 6, including a locking assembly disposed adjacent a second side of said gate member and having a lock bolt slideably mounted thereon for movement into a matching receptacle to lock the gate in the closed position.

8. A gate assembly used with a vehicle which has a cargo area defined by at least two sides extending substantially parallel to one another, comprising: first and second gate members connected to the vehicle within the cargo area, said gate members being disposed for movement between an open position to allow access into the cargo area and a closed position to limit access into the cargo area, each said gate member having a body with first and second sides; guiding means connected to the vehicle for restricting movement of the first end of each said gate member to a direction line substantially parallel to the parallel sides of the vehicle and for restricting movement of the second side of each said gate member to a direction line substantially perpendicular to the parallel sides when said gate members are being moved between the open and closed position; and locking means adapted to maintain the first and second sides of each gate member in a fixed transverse relation to the parallel sides of the vehicle when said gate member is in the closed position.

9. A gate assembly as set forth in claim 8, wherein said guiding means includes upper and lower channel members disposed along one sidewall of the vehicle and an end member extending transversely between the sidewalls of the vehicle, and roller apparatus connected to each gate member and moveably disposed within said channel members.

10. A gate assembly as set forth in claim 9, including a flexible cover connected to each said channel member and extending across an opening into said channel member to prevent foreign matter from entering said channel member.

11. A gate assembly as set forth in claim 8, wherein each said gate member includes a frame structure of tubular members; and including upper and lower latch assemblies disposed adjacent a sidewall of the vehicle and disposed to engage a tubular member extending along the first side of said gate member when said gate member is moved into the closed position.

12. A gate assembly as set forth in claim 11, wherein said guiding means includes upper and lower channel members disposed along one sidewall of the vehicle and an end member extending transversely between the sidewalls of the vehicle, and roller apparatus connected to the gate member and moveably disposed within said channel members.

13. A gate assembly as set forth in claim 12, including a flexible cover connected to each said channel member and extending across an opening into said channel member to prevent foreign matter from entering said channel member.

14. A gate assembly as set forth in claim 13, including a locking assembly disposed adjacent the second end of said gate members including a locking bolt received within tubular support members provided on one of said gate members and a tubular receiving member aligned with said locking bolt for receipt therein when said first and second gate members are located in the closed position.

15. A trailer gate assembly comprising: a gate member adapted to be disposed within the cargo area of a trailer, said gate member having a body with first and second sides; guide means for use in moving said gate member between an open position to allow access into the cargo area and a closed position to limit access into the cargo area, wherein said guide means restricts movement of said first side of said gate member in a direction parallel to a side of the trailer and restricts the movement of said second side of said gate member to a direction transverse to the direction of movement of said first side; follower means connected to said gate member and adapted to cooperate with said guide means for moving the first side of said gate member in a direction line substantially parallel to the side of the trailer and for moving the second side of said gate member in a direction line substantially perpendicular to the side of the trailer when said gate member is being moved between the open and closed positions; and locking means adapted to maintain the first and second sides of said gate member in a fixed transverse relation to the side of the trailer when said gate member is in the closed position.

16. A trailer gate assembly comprising: a first and second gate members adapted to be disposed within the cargo area of a trailer, said gate members each having a body with first and second sides; guide means for use in moving said gate members between an opened position to allow access into the cargo area and a closed position to limit access into the cargo area, wherein said guide means restricts movement of said first side of said gate members in a direction parallel to a side of the trailer and restricts the movement of said second side of said gate members to a direction transverse to the direction of movement of said first side; follower means connected to said gate members and adapted to cooperate with said guide means for moving the first side of said gate members along a direction line substantially parallel to the sides of the trailer and for moving the second side of said gate members along a direction line substantially perpendicular to the sides of the trailer when said gate members are being moved between the opened and closed positions; and locking means adapted to maintain the first and second sides of each gate member in a fixed transverse relation to the sides of the trailer when said gate member is in the closed position.

* * * * *

UNITED STATES PATENT AND TRADEMARK OFFICE
CERTIFICATE OF CORRECTION

PATENT NO. : 4,416,482
DATED : November 22, 1983
INVENTOR(S) : Charles C. Patterson It is certified that error appears in the above—identified patent and that said Letters Patent are hereby corrected as shown below:

Column 2, line 38, change "is" to -- in --

Column 5, line 61, change "position" to -- positions --

Column 6, line 60, delete "a", second occurrence.

Signed and Sealed this

Twenty-seventh Day of March 1984

[SEAL]

Attest:

GERALD J. MOSSINGHOFF

Attesting Officer

Commissioner of Patents and Trademarks